United States Patent Office 3,577,241
Patented May 4, 1971

3,577,241
METHOD OF PREPARING EDIBLE ANIMAL FEET
Ray H. Means, Omaha, and Michael Kussman and Jack Wade, Papillion, Nebr., and Victor H. Vodra, Denver, Colo., assignors to American Beef Packers, Inc., Omaha, Nebr.
No Drawing. Filed Apr. 10, 1969, Ser. No. 815,224
Int. Cl. A22c 18/00
U.S. Cl. 99—7
9 Claims

ABSTRACT OF THE DISCLOSURE

A new process for preparing edible animal feet (particularly cattle and horses' feet) cleans and dehairs the feet mechanically by scalding the same in a hot caustic wash in a mechanical washing machine to remove dirt and hair from the feet; the cleaned and dehaired feet are bleached in a sodium percarbonate treatment at a lower temperature than the scald, and the resulting feet are rinsed and neutralized in non-toxic acid rinse solution.

---

Beef feet have been a specialty food item for thousands of years, however, the method of processing the feet has not substantially changed during that time. Traditionally, the feet are scalded in hot water and the hair and dirt are laboriously hand-scraped from the feet, the hooves are removed and cleaned, and the feet are then cooked. This hand cleaning procedure consumes considerable time to properly clean the feet, and mass production is not possible and the product is too costly, only a few feet being produced for consumption. The edible form of the feet, however, brings from 4 to 10 times the price of untreated feet, which are generally rendered as tankage and sold for fertilizer. As more of the edible type of feet has become available a great number of uses beyond the traditional foods has been found, particularly in liquid stock and specialty food items. Therefore, the feet have provided another important source of income for the packer.

The feet and lower legs of cattle and horses invariably include considerable dirt, along with the hair and other inedible matter, and due to the environment in which the feet exist a very difficult problem of cleaning is encountered. Hair grows in the skin folds and crevices making hand scraping removal thereof very difficult. We have found that animal feet, particularly cattle and horses' feet, are effectively cleaned and dehaired by mechanically washing the same in a hot caustic solution in a mechanical washer, such as a scalder, tripe washer, or the like. The washer should not include internal appendages so that the tumbling and agitation of a rotating washer does not further damage the feet but effectively and continuously during washing flushes a hot solution past all surfaces of the feet. When cleaned and dehaired the feet are treated with a hot sodium percarbonate solution and then rinsed in an acid rinse solution of a non-toxic organic acid to neutralize the alkaline materials on the feet.

It is, therefore, among the objects and advantages of the invention to provide a simple, effective, and economical process for preparing an edible product from animal feet and lower limbs, particularly beef feet for human consumption and horses' feet for pet food.

A further object of the invention is to provide a process for cleaning animal feet using available equipment in a packing plant, which process is economical and is readily accomplished.

Another object of the invention is to provide fast, effective treatment of beef feet in a relatively short time for producing a product suitable for cooking into an edible product.

These and other objects and advantages of the invention may be ascertained by the following description, which is intended as illustrative of the method of the invention and not limiting to the precise details set forth.

In general, the process of the invention involves the collection of animal feet in containers under approved procedures and with proper inspection. The animal feet are then placed in a washer and rinsed with clear water for a sufficient period of time to remove extraneous dirt from the parts, and the feet are then drained. The feet are then immersed in a strong caustic solution in the washer and heat is added to raise the temperature into a temperature range of about 150–200° F. The solution may be hot or steam or heating means used to heat the solution. The washer is then operated for about five to fifteen, preferably about ten minutes, agitating the feet in the caustic solution. At the end of that period the solution is drained from the washer and a sodium percarbonate solution is introduced into the washer, and the feet are treated and bleached at a temperature range of from 135° to 150° F. for from two to seven minutes. This solution is drained and the parts rinsed with clear water. The feet are then neutralized with a solution of a non-toxic organic acid such as citric, tartaric, malic, lactic, etc. The feet are then rinsed in clear, cool water. The scalded and dehaired feet are withdrawn and inspected for bruises, and the hooves and other extraneous matter removed. Where desired the clean parts may be placed in a drum of cold water and air bubbled through the water, which may contain neutralizing acid if desired. The air is bubbled through the water for up to twenty minutes to neutralize, whiten, and firm the edible parts of the feet. At the end of this procedure the firmed and whitened parts are then removed and hung on a rack for final inspection.

Most modern packing plants have tripe washers, or other drum-type laundry washers, for washing various parts of the animal. Such washers provide adequate equipment for washing animal feet, since such washers thoroughly agitate the animal feet in water or a solution providing complete circulation of the fluid around and through the animal feet. Since such washers are conventional equipment a detailed description herein is not deemed necessary.

A specific example of the preparation of beef feet is as follows: raw feet in the plant are collected and placed in containers under approved procedure according to the processed meat division of the C & MS of the USDA. A quantity of feet may be placed in a washer having no rough surfaces inside the cylinder. Tap water is turned into the washer which is then rotated for a period of about ten minutes to wash the raw feet with the cold or cool water, normally considered the temperature of the tap. After washing the feet, which removes the superficial dirt, the water is drained from the washer. A sufficient amount of water, with from 3 to 5 ounces of caustic per gallon of water is introduced into the washer to cover the feet. The feet are then treated in the solution by heating the solution to a temperature of from 150° to 200° F., and the washer is rotated for about ten minutes. At the end of this time the solution is drained from the washer, and a sodium percarbonate solution is introduced into the washer to treat and bleach the parts at about 135 to 150° F. for from two to seven minutes. The sodium percarbonate (sodium carbonate peroxide) may be present in the bleach solution in an amount from about a tenth to two ounces per gallon. At the end of this treatment time the bleach solution is drained from the feet, and the feet are then rinsed in a warm aqueous solution of a non-toxic polycarboxylic organic acid to neutralize the feet. After the neutralization the feet are rinsed with cold water or alternatively they may be placed in a drum of cold water, which may contain a neutralizing acid if desired, and air bubbled through the water for up to about twenty minutes so as to neutralize, whiten and firm the feet before being removed from the drum and hung on racks for inspection. The amount of acid used is sufficient to provide a substantially neutral solution at the end of the rinse period, and this generally is determined by the amount of caustic present which must be neutralized. The acids useful for the process include non-toxic, natural hydroxy-polycarboxylic acids containing 3 to 6 carbon atoms, for example, citric, lactic, malic, tartaric acids and such other acids as isocitric, dl-citramalic, dl-2-hydroxy-2-methyl butanedioic acid, desoxalic acid (1,2-dihydroxy-1, 1,2-ethanetricarboxylic acid) etc.

The caustic solution useful for the hot caustic wash includes those chemicals approved by governmental authorities controlling meat processing. The chemicals for the solution include caustic soda, soda ash, sodium metasilicate, etc. These are generally considered alkaline detergents in the industry. Various non-toxic conditioners, wetting agents, etc. may be used in the caustic solution, according to approved practices.

The invention may be further developed within the scope of the following claims, accordingly the foregoing description is merely illustrative of an operative embodiment and not in a limiting sense.

We claim:

1. A process for preparing edible animal products of beef feet and horse feet comprising:
   (a) initially washing such animal feet in tap water to to remove extraneous dirt,
   (b) heating and agitating the washed animal feet in a mechanical washer with an aqueous caustic soda solution containing from three to five ounces of said caustic soda per gallon of water for a period of up to about ten minutes in a temperature range of from 150–200° F.,
   (c) draining the solution from said feet,
   (d) agitating said feet with a bleaching solution of sodium percarbonate at a temperature range of 135–150° F., said percarbonate solution being at a concentration of about 1/10 to 4 ounces to a gallon,
   (e) draining said bleach solution from said feet,
   (f) washing said feet with a neutralizing solution of a non-toxic hydroxy-polycarboxylic acid containing from 3 to 6 carbon atoms in water, so that the effluent of said wash is about neutral at the end of said wash,
   (g) draining and finally rinsing said feet with clear water,
   (h) and then manually removing bruises, extraneous material and the hooves from the feet.

2. A process according to claim 1 wherein said feet after said final rinse are placed in a container of cold water and air is bubbled through the water for a period of up to about twenty minutes to firm and whiten the edible parts thereof.

3. A process according to claim 2 wherein a non-toxic organic acid is introduced into said container of cold water to further neutralize said feet.

4. A process according to claim 1 wherein said acid is citric acid.

5. A process according to claim 1 wherein said acid is malic acid.

6. A process according to claim 1 wherein said acid is lactic acid.

7. A process according to claim 1 wherein said acid is tartaric acid.

8. A process according to claim 1 wherein said neutralizing solution is at a temperature substantially lower than said caustic wash solution.

9. A process according to claim 1 wherein said final rinse is at a temperature of tap water to cool said treated feet.

References Cited
UNITED STATES PATENTS

| | | | |
|---|---|---|---|
| 3,025,166 | 3/1962 | Smith | 99—107 |
| 3,025,170 | 3/1962 | Murphy et al. | 99—194 |
| 3,070,448 | 12/1962 | Williams | 99—107X |
| 3,475,179 | 10/1969 | Smith | 99—107 |

NORMAN YUDKOFF, Primary Examiner

F. E. DRUMMOND, Assistant Examiner

U.S. Cl. X.R.

99—2R, 18, 107, 230